April 29, 1941. L. R. TOBIE 2,239,944

AMUSEMENT RIDE DEVICE

Filed March 28, 1940

Inventor:
Lewis R. Tobie
By Charles A. Warren
Attorney

Patented Apr. 29, 1941

2,239,944

UNITED STATES PATENT OFFICE 2,239,944

AMUSEMENT RIDE DEVICE

Lewis R. Tobie, Augusta, Ill.

Application March 28, 1940, Serial No. 326,343

12 Claims. (Cl. 272—36)

The present invention relates to an amusement ride device in which the occupants are carried around on a substantially circular track which is preferably undulatory.

For carnivals and amusement parks the effort is continually made to provide a new type of ride by which the passenger may obtain a different or greater thrill than on the familiar type of amusement devices. After the well known merry-go-round, came ride devices, which in addition to carrying the occupant around a circle, also had the track undulatory so that the passenger would also be carried up and down as the device rotated. Various adaptations of this form of ride have been developed although in each case the passenger has remained in an upright position, or substantially so, during the entire ride. The principal object of the present invention is to provide, during the ride, for turning the passenger head-over-heels in the car in which he is riding, and this may be accomplished by rotating the entire car about a horizontal axis.

In order to avoid injury or to save the rider from illness in the event that the ride is too terrifying, the invention includes a provision for rendering the tipping device inoperative so that the car will not be rotated about the horizontal axis and the passenger will accordingly not be turned head-over-heels.

Other and further objects and advantages of the invention will appear from the following detailed description taken in connection with the accompanying drawing in which—

Figure 2:
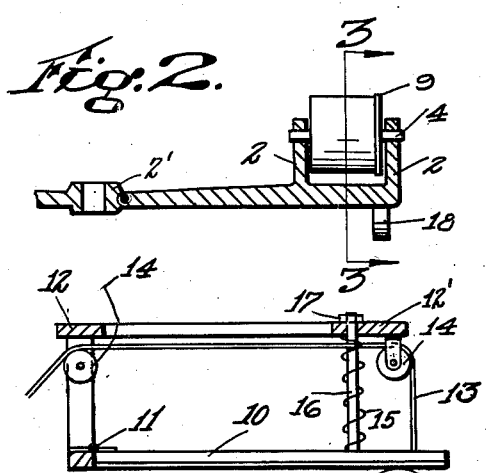
Fig. 2 is a sectional view substantially along the line 2—2 of Fig. 1.

With reference to the drawing, the device has an annular rotating platform 1 above which are supported on brackets 2 a plurality of barrel or drum-shaped cars 3, the latter having projecting trunnions 4 journalled in the brackets. The axes about which the barrels are rotated are substantially horizontal, as shown in Fig. 2, and these axes all intersect substantially at the vertical axis about which the platform 1 is rotated. A stationary platform 5 may be provided to extend partially or entirely around the platform 1 and serve as a loading platform.

Figure 4:
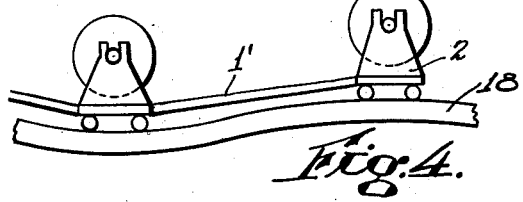
Fig. 4 is a fragmentary side elevation showing the undulatory track.

As shown in Fig. 4, the brackets 2 which extend from the cars toward the vertical axis about which the platform rotates (see Fig. 2), are connected by wedge shaped sections 1' suitably pivoted at their opposite edges to the brackets to produce an articulated platform made up of the sections 1' and the brackets 2 that is capable of following undulations of the track 18. The brackets 2 are pivoted to a central hub 2', as shown in Fig. 2, and thus a vertical movement of the cars 3 is possible.

Figure 3:
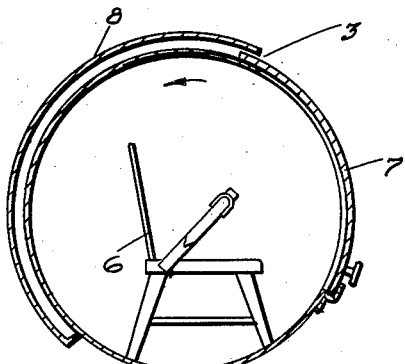
Fig. 3 is a sectional view along the line 3—3 of Fig. 2, showing a section through the car.

As shown in Fig. 3, each of the cars 3 has a seat 6 positioned therein and so located that with the passenger or passengers seated therein the car will remain substantially upright. A suitable slidable door 7 movable in guideways 8 permits access to the car and prevents the occupant from dropping out as the car is rolled over. Suitable straps, or other securing devices may be provided for holding the occupants in the seats, if desired.

As shown in Fig. 2, the outer periphery of the car has a wide band 9 extending therearound and this band is adapted to engage with a horizontally extending clutch bar 10 hinged as at 11 to a stationary arm 12 above the cars. The free end of the bar 10 is connected by a cable 13 which passes over a set of pulleys 14 to a hand-controlled lever, not shown, suitably located near the operator's stand, represented by the rectangle 13, Fig. 1, so that by moving the lever the free end of the bar 10 may be elevated. A spring 15 between the bar and a second arm 12' urges the bar downwardly and the downward movement is limited by a threaded rod 16 having a limiting nut 17 on the upper end thereof.

Figure 1:
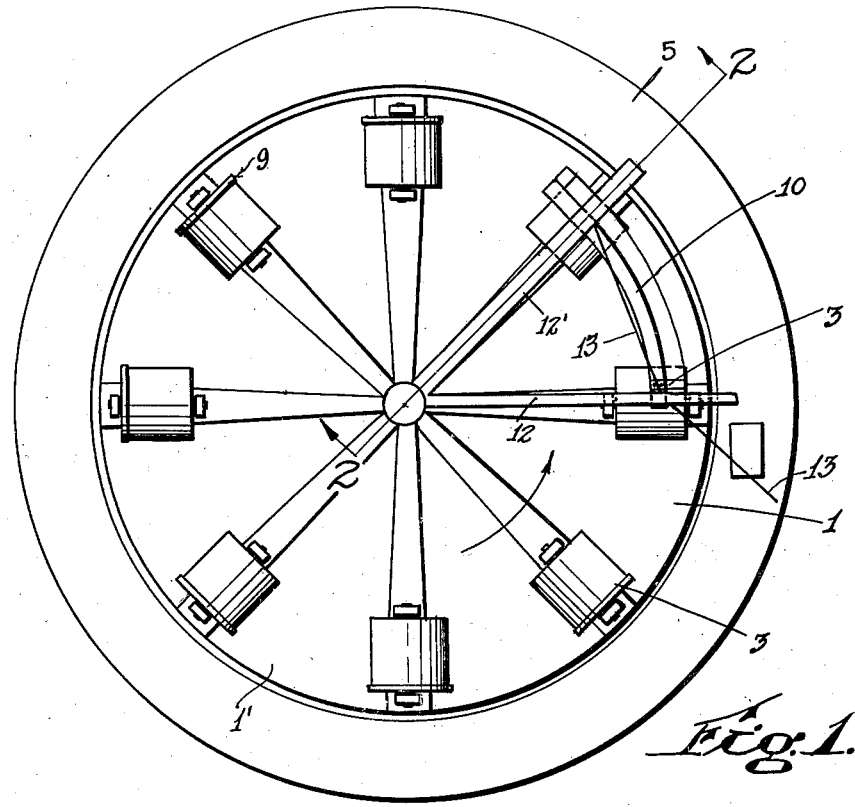
Fig. 1 is a plan view of the device embodying the invention.

The cars 3 and platform 1 are mounted on a track 18 which, as shown in Fig. 4, is undulatory, to alternately raise and lower the cars as the platform 1 and cars are rotated about a central vertical axis. It will be understood that the platform 1 is articulated so that the undulatory movement is possible. The hills and valleys of the track 18 are so arranged that the cars are elevated as they start to pass beneath the bar 10, thereby bringing the band 9 into engagement with said bar, the latter being curved, as shown in Fig. 1, causing the car to be rotated in the direction of the arrow, Fig. 3, as the car moves up to the top of the undulation and begins its downward movement again. The bar 10 is preferably so located that only enough momentum will be imparted to the car so that it will turn through one complete revolution.

Although only one bar 10 is shown, so that the car with the occupant seated therein will be turned about its own axis only once during each full operation of the platform 1, it will be understood that more of these clutch bars may be provided at each point where there is an undulation in the tract, if desired, providing with each bar 10 a separate control device for rendering that bar inoperative.

Although the bars are shown in conjunction with a "hill" on the track, it will be obvious that by lowering the position of the bar the cars may be rotated about their own axes even though the track is not undulatory. It has been found, however, that the combination of undulatory track to impart an upward and downward movement to the passengers as the car is rotated about its own axis, gives a greater thrill than would be obtained from a flat track.

The mechanism for rotating the platform and the cars mounted thereon about a central vertical axis is not described as any suitable means may be provided for this purpose, bearing in mind that some means is used so that the platform may be stopped for loading and unloading passengers, this last means being accessible to the same operator who controls the positions of the clutch bar 10.

The device having been loaded with passengers and the doors 7 on the cars having been closed, the rotation of the device about a central vertical axis is started by the operator with the clutch 10 held in inoperative position. When the platform and cars have begun to travel at the full rate of speed, the bar or bars 10 are lowered into operative position so that as each of the cars rotates about its vertical axis it is rolled backward about its own axis for a complete revolution as it passes under each of the bars 10. In the event that any passenger is inconvenienced by the backward rolling of the cars, the bars 10 may be rendered inoperative by the operator until the device can be brought to rest. It will be understood that the cars may have openings in the sides and ends through which the passengers may look and be seen, these openings being preferably screened, or otherwise protected, so that an occupant in case he loses his seat, will not be injured.

Although the above description is based upon the use of the device as an amusement ride, with each of the cars made large enough to accommodate one or more grown persons, the device may, if desired, be built on a considerably smaller scale to be operated as a toy, in which event the same features will be incorporated without, however, having the cars as large.

I claim:

1. In a device of the class described, a circular track, a platform rotatable on said track, a plurality of barrels mounted on said platform, and each barrel being supported for rotation about a substantially horizontal axis, and means engageable with said barrels at least at one point during their rotation for imparting in response to movement of the platform an intermittent rotation to each of the barrels about its substantially horizontal axis.

2. In a device of the class described, a circular track, a platform rotatable on said track, a plurality of barrels mounted on said platform, and each barrel being supported for rotation about a substantially horizontal axis, means engageable with said barrels at least at one point during their rotation for imparting in response to movement of the platform an intermittent rotation to each of the barrels about its substantially horizontal axis, and means for rendering said rotation imparting means inoperative.

3. In a device of the class described, a circular track, a platform rotatable on said track, a plurality of barrels mounted on said platform, and each barrel being supported for rotation about a substantially horizontal axis, each barrel having a seat mounted therein for rotation therewith about the barrel's substantially horizontal axis, and means engageable with said barrels at least at one point during their rotation for imparting in response to movement of the platform an intermittent rotation to each of the barrels about its substantially horizontal axis.

4. In a device of the class described, a rotary substantially horizontal platform, at least one seat mounted on said platform, said seat being mounted for rotation about a substantially horizontal axis above the platform, and means engageable with said seat at least at one point during its rotation for imparting to the latter an intermittent rotation about its horizontal axis in response to the rotation of the platform.

5. In a device of the class described, a rotary substantially horizontal platform, at least one seat mounted on said platform, said seat being mounted for rotation about a substantially horizontal axis above the platform, means engageable with said seat at least at one point during its rotation for imparting to the latter an intermittent rotation about its horizontal axis in response to the rotation of the platform, and means for rendering said rotation imparting means inoperative.

6. In an amusement ride device, a circular undulatory track, a plurality of barrels movable on the track about a common vertical axis, means for supporting each barrel for rotation about a substantially horizontal axis substantially centrally of the barrel, a seat mounted in each barrel for rotation therewith, and spaced stationary means engageable with the barrel during its rotation for imparting thereto an intermittent rotation of the barrel about its substantially horizontal axis.

7. In an amusement ride device, a circular undulatory track, a plurality of barrels movable on the track about a common vertical axis, means for supporting each barrel for rotation about a substantially horizontal axis substantially centrally of the barrel, a seat mounted in each barrel for rotation therewith, and spaced stationary means engageable with the barrel during its rotation for imparting thereto an intermittent rotation of the barrel about its substantially horizontal axis, said rotation imparting means being positioned for engagement with the barrel at a point where the barrel is moving upwardly on the undulatory track.

8. In an amusement ride device, a circular undulatory track, a plurality of barrels movable on the track about a common vertical axis, means for supporting each barrel for rotation about a substantially horizontal axis substantially centrally of the barrel, a seat mounted in each barrel for rotation therewith, said seat being positioned below the horizontal axis of the barrel so that the weight of the occupant will normally hold the seat in upright position, and spaced stationary means engageable with the barrel during its rotation for imparting thereto an intermittent rotation of the barrel about its substantially horizontal axis.

9. In an amusement ride device, a circular undulatory track, a plurality of barrels movable on the track about a common vertical axis, means for supporting each barrel for rotation about a substantially horizontal axis substantially centrally of the barrel, a seat mounted in each barrel for rotation therewith, said seat being positioned below the horizontal axis of the barrel so that the weight of the occupant will normally hold the seat in upright position, each of said barrels having a door therein for access to the interior, and spaced stationary means engageable with the barrel during its rotation for imparting thereto an intermittent rotation of the barrel about its substantially horizontal axis.

10. In an amusement ride device, a rotary platform, a circular undulatory track on which said platform is mounted, a plurality of barrels arranged in spaced relation to each other adjacent to the periphery of the platform, each barrel being mounted on the platform for rotation about a substantially horizontal axis, stationary means positioned above the platform and barrels and engageable with the periphery of the barrels for imparting an intermittent rotation to the barrels as they rotate with the platform, said rotation imparting means including a bar hinged at its rearward end and having its forward end urged downwardly by a spring for engagement with the periphery of the barrel.

11. In an amusement ride device, a substantially circular track, a platform rotatable on said track, at least one rotary drum mounted on said platform, the drum being supported for rotation about a substantially horizontal axis, and means operative as the platform rotates for procuring an intermittent rotation of the drum about its horizontal axis.

12. In an amusement ride device, a substantially circular track, a platform rotatable on said track, at least one rotary drum mounted on said platform, the drum being supported for rotation about a substantially horizontal axis, means operative as the platform rotates for procuring an intermittent rotation of the drum about its horizontal axis, and means for rendering the intermittent rotation imparting means inoperative.

LEWIS R. TOBIE.